US007719940B2

United States Patent
Ishihara et al.

(10) Patent No.: US 7,719,940 B2
(45) Date of Patent: May 18, 2010

(54) TILT CORRECTING APPARATUS AND METHOD, INFORMATION RECORDING APPARATUS, AND INFORMATION RECORDING/REPRODUCING APPARATUS

(75) Inventors: Kanji Ishihara, Saitama (JP); Hidenori Nakagawa, Saitama (JP); Hisao Tanaka, Saitama (JP)

(73) Assignee: Pioneer Corporation, Tokyo (JP)

( * ) Notice: Subject to any disclaimer, the term of this patent is extended or adjusted under 35 U.S.C. 154(b) by 1086 days.

(21) Appl. No.: 11/170,186

(22) Filed: Jun. 30, 2005

(65) Prior Publication Data

US 2006/0002254 A1  Jan. 5, 2006

(30) Foreign Application Priority Data

Jun. 30, 2004  (JP) ............................. 2004-193423

(51) Int. Cl.
G11B 7/00 (2006.01)
(52) U.S. Cl. ................ 369/53.19; 369/44.13; 369/44.26
(58) Field of Classification Search ........................ None
See application file for complete search history.

(56) References Cited

U.S. PATENT DOCUMENTS

| | | | | |
|---|---|---|---|---|
| 6,157,600 | A * | 12/2000 | Nakamura et al. | 369/44.32 |
| 6,594,206 | B2 * | 7/2003 | Katayama | 369/44.32 |
| 7,187,636 | B2 * | 3/2007 | Kato et al. | 369/53.19 |
| 2003/0099171 | A1 * | 5/2003 | Ito | 369/44.32 |
| 2003/0117919 | A1 * | 6/2003 | Tatsuta | 369/53.19 |
| 2003/0179665 | A1 * | 9/2003 | Iwazawa et al. | 369/44.32 |
| 2004/0042356 | A1 * | 3/2004 | Kato et al. | 369/44.32 |

FOREIGN PATENT DOCUMENTS

JP   2002-288859   10/2002

* cited by examiner

*Primary Examiner*—Lixi Chow
(74) *Attorney, Agent, or Firm*—Nixon & Vanderhye, PC

(57) ABSTRACT

A tilt correcting apparatus makes a tilt correction in an information recording apparatus or the like capable of recording record information onto an information recording medium, on an information recording surface of which a track having a wobble is formed, by emitting laser light thereonto. The tilt correcting apparatus is provided with: a correcting device for changing an irradiation angle of the laser light; a controlling device for controlling the correcting device such that the irradiation angle is set to be each of a plurality of predetermined angles before the record information is recorded; a wobble detecting device for detecting a wobble signal corresponding to the wobble from a photo-detection signal of light from the track caused by the laser light; and a tilt determining device for determining an amount of tilt of the information recording surface, on the basis of the detected wobble signal. The controlling device controls the correcting device to correct the irradiation angle in accordance with the determined amount of tilt when the record information is recorded.

13 Claims, 10 Drawing Sheets

RF Amplitude and Wobble Amplitude vs. PU Variations
PU Sample 1

RF Amplitude and Wobble Amplitude vs. PU Variations
PU Sample 2

TILT CORRECTING APPARATUS AND METHOD, INFORMATION RECORDING APPARATUS, AND INFORMATION RECORDING/REPRODUCING APPARATUS

BACKGROUND OF THE INVENTION

1. Field of the Invention

The present invention relates to a tilt correcting apparatus for and a tilt correcting method of detecting the amount of disc tilt (hereinafter merely referred to as the "amount of tilt") in an optical disc, such as a writable DVD+R and a writable DVD+RW, and making a tilt correction on the basis of the detected amount of tilt, and an information recording apparatus and an information recording/reproducing apparatus, such as a DVD recorder, including such a tilt correcting apparatus.

2. Description of the Related Art

On an information reproducing apparatus, such as a DVD player, it is extremely important to irradiate an optical disc which is set, such as a DVD, with laser light for reading, from a direction perpendicular to the recording surface of the optical disc, in order to optically read information, accurately. This is because the inclination, i.e., "tilt" of the information recording surface of the optical disc, such as a DVD, to the laser light deteriorates a reproduction signal, depending on the amount of tilt (i.e., a tilt amount or a tilt angle) as being the extent of the inclination, or the angle of tilt. Thus, conventionally, on a read-only optical disc, such as a DVD-ROM, the amount of tilt of the information recording surface is detected by using the amplitude of a Radio Frequency (RF) signal, which is detected in accordance with the presence of record information (i.e. recording pits). Then, at the time of actual reproduction of the record information, the irradiation angle of the laser light is fine-tuned so as to cancel the amount of tilt (which is referred to as a "tilt correction" herein as occasion demands) with respect to the information recording surface; namely, the laser irradiation angle to the information recording surface is set so as to increase the amplitude of the RF signal, to thereby prevent the deterioration of the reproduction signal by tilt.

On the other hand, even an information recording apparatus or an information recording/reproducing apparatus, such as a DVD recorder, at the time of recording, it is extremely important to irradiate an optical disc with laser light for writing, from a direction perpendicular to the information recording surface of the optical disc, in order to optically write information. This is because the presence of tilt causes a large light spot to be formed on the information recording surface, depending on the amount of tilt, to thereby deteriorate a writing signal. In this case, if the writable disc, such as a DVD+RW, is unrecorded, it is impossible to detect the RF signal corresponding to the record information, as in the above-mentioned DVD-ROM or the like. Thus, in place of the RF signal, the amplitude of a tracking error signal which uses land/groove tracks is used for the detection of the amount of tilt. For example, in reproducing the information on an optical disc in a wobble•land pre-pit manner, the signal amplitude of a RF difference signal (i.e. the tracking error signal) and the amplitude of a land pre-pit signal can be used, to thereby detect the amount of tilt (e.g. refer to Japanese Patent Application Laid Open NO. 2002-288859).

However, the irradiation angle of the laser light which gives a peak to the RF signal is not generally equal to the irradiation angle of the laser light which gives a peak to the tracking error signal. Namely, there is such a technical problem that the highly accurate tilt correction is essentially difficult or impossible from the detection of the amount of tilt by using the tracking error signal. Moreover, in order to detect the amount of tilt by using the tracking error signal, it is necessary to open tracking servo, for the detection of the amount of tilt at one point for recording, then, measure the tracking error signal, then, close the tracking servo, and then, perform a next detection. For such detection, it takes, e.g., several tenths of a second. Thus, if it is desired to obtain the distribution of the amount of tilt on the whole disc, it takes several seconds since the same detection is performed at a plurality of points for recording. Namely, there is also such a technical problem that the quick detection of the amount of tilt is essentially difficult.

SUMMARY OF THE INVENTION

It is therefore an object of the present invention to provide: a tilt correcting apparatus, a tilt correcting method, and an information recording apparatus, which can make a tilt correction, highly accurately or relatively quickly, even for a writable information recording medium on which a RF signal cannot be obtained.

(Tilt Correcting Apparatus)

The above object of the present invention can be achieved by a tilt correcting apparatus for making a tilt correction in an information recording apparatus or an information recording/reproducing apparatus capable of recording record information onto an information recording medium, on an information recording surface of which a track having a wobble is formed, by emitting laser light thereonto, the tilt correcting apparatus provided with: a correcting device for changing an irradiation angle of the laser light with respect to the information recording medium; a controlling device for controlling the correcting device such that the irradiation angle is set to be each of a plurality of predetermined angles before the information recording apparatus or the information recording/reproducing apparatus records the record information; a wobble detecting device for detecting a wobble signal corresponding to the wobble from a photo-detection signal of light from the track caused by the laser light in such a condition that the irradiation angle is set to be each of the plurality of predetermined angles; and a tilt determining device for determining an amount of tilt of the information recording surface with respect to the laser light, on the basis of the detected wobble signal, the controlling device controlling the correcting device to correct the irradiation angle in accordance with the determined amount of tilt when the information recording apparatus or the information recording/reproducing apparatus records the record information.

According to the tilt correcting apparatus, at first, before the record information is recorded onto the information recording medium on the information recording apparatus or the information recording/reproducing apparatus, such as a DVD recorder, the irradiation angle of the laser light is set or made to be each of the plurality of predetermined angles by the correcting device, such as a liquid crystal correction element, under the control of the controlling device, such as a CPU. Here, the "information recording medium" is an information recording medium of a writable type or of an irreversible change recording type. Moreover, tracks, such as groove tracks and land tracks, having a wobble are formed on the information recording surface of the information recording medium. Moreover, the "laser light" is irradiated or emitted from a semiconductor laser light source onto the information recording surface through an optical system, such as a beam splitter and an objective lens. Then, the irradiation angle is set or made to be each of the plurality of predetermined angles by the correcting device.

As described above, in such a condition that the irradiation angle is set to be each of the plurality of predetermined angles, for example, reflected light reflected by the track (or light which is transmitted, diffracted, refracted, scattered, or the like on the track) is received by the light receiving element (e.g., a photo-detector) of an optical pickup, to thereby generate and output a photo-detection signal (e.g., a light receiving signal) of the light from the track caused by the laser light. From this photo-detection signal, a wobble signal corresponding to the wobble is detected by the wobble detecting device. The wobble detecting device includes a detecting apparatus which can detect the amplitude of a wobble signal, for example. The amplitude of a wobble signal is detected by performing the bottom hold and the peak hold of a wobble signal.

Then, the amount of tilt of the information recording surface with respect to the laser light is detected by the tilt detecting device, on the basis of the wobble signal detected in this manner (e.g. the amplitude of a wobble signal). In this case, the "amount of tilt" in the present invention may be also referred to as an "amount of disc tilt" or a "tilt angle" and denotes an angle made by the irradiation direction of the laser light (i.e. the injection direction of the laser light with respect to the information recording surface) and the normal direction of the information recording surface. Alternatively, it denotes an angle made by the irradiation direction of the laser light and the ideal irradiation direction of the laser light which maximizes a RF (Radio Frequency) signal if the RF signal is detected from the information recording surface. Normally, the ideal irradiation direction of the laser light and the normal direction of the information recording surface, which can be the reference of the amount of tilt, correspond to each other; however, they may be slightly different. Which direction is used as a reference to define the amount of tilt is one of design matters.

Then, upon actually recording the record information, the irradiation angle is corrected in accordance with the determined amount of tilt, by the correcting device, under the control of the controlling device. Namely, a tilt correction is made or performed. In that condition, the record information is recorded. For example, the irradiation angle of the laser light is fine-tuned in a range of about ±several tenths of a degree so as to make the amount of tilt at the time of recording close to 0 degree or be exact 0 degree.

As a result, even if a RF signal corresponding to the record information cannot be detected because the information recording medium is unrecorded, the amount of tilt can be determined, and on the basis of this, a tilt correction can be made. Particularly, as compared to the case where a tracking error signal is used as in the above-mentioned related art, it is unnecessary to open and close the tracking servo in determining or detecting the amount of tilt, so that it can be performed in a relatively short time. Moreover, in the case where a wobble signal is used, it is possible to increase the sensitivity of a signal near where the tilt angle is 0 degree. In other words, it is possible to make a steep slope in a portion including the maximum value near where the tilt angle is 0 degree, on the feature curve of a signal versus the tilt angle. As described above, the measurement sensitivity can be substantially improved, which allows the determination or detection of the tilt angle at higher accuracy. Thus, a tilt correction can be made at higher accuracy.

Incidentally, the "wobble detecting device" in the present invention may be used not only for the detection of the amount of tilt or the amount of tilt correction, but also for information recording, i.e. for the generation of a clock for recording. The "correcting device" may be used not only for the tilt correction, but also for the optical correction, such as the correction of an aberration.

In one aspect of the tilt correcting apparatus of the present invention, the correcting device includes a liquid crystal correction element located in an optical path of the laser light.

According to this aspect, it is possible to correct the irradiation angle of the laser light in accordance with the amount of tilt, without tilting the light source of the laser light and other optical elements, such as an objective lens, located in the optical path, by canceling the coma aberration of the laser light by a liquid crystal correction element located in the optical path.

In another aspect of the tilt correcting apparatus of the present invention, the correcting device corrects the irradiation angle so as to make the irradiation direction and a normal direction of the information recording surface be close to each other, in accordance with the determined amount of tilt, under the control by the controlling device.

According to this aspect, it is possible to make a tilt correction, quickly and highly accurately, by making the irradiation direction of the laser light close to the normal direction of the information recording surface. If the amount of tilt is defined on the basis of the normal direction of the information recording surface, such a tilt correction can be made by making the amount of tilt close to 0 degree.

In another aspect of the tilt correcting apparatus of the present invention, the correcting device corrects the irradiation angle so as to make the irradiation direction and an ideal irradiation direction of laser light which maximizes a RF signal assuming that the RF signal is detected from the information recording surface, be close to each other, in accordance with the determined amount of tilt, under the control by the controlling device.

According to this aspect, it is possible to make a tilt correction, quickly and highly accurately, by making the irradiation direction of the laser light close to the ideal irradiation direction of the laser light. If the amount of tilt is defined on the basis of the ideal irradiation direction of the laser light, such a tilt correction can be made by making the amount of tilt close to 0 degree.

In another aspect of the tilt correcting apparatus of the present invention, the controlling device controls the correcting device such that the plurality of predetermined angles are three predetermined angles, and the tilt determining device obtains a feature curve of an amplitude of the wobble signal versus the irradiation angle, from three wobble signals corresponding to the three predetermined angles, and thereby determines the amount of tilt from an irradiation angle value which gives a maximum value on the obtained feature curve.

According to this aspect, a feature curve of the amplitude of the wobble signal can be obtained from three wobble signals. Then, the amount of tilt is determined from an irradiation angle value which gives the maximum value on this feature curve. Thus, it is possible to determine the amount of tilt, relatively easily. For example, a first predetermined angle is an irradiation angle to the information recording surface if a tilt correction is not made at all by the correcting device. Moreover, an angle inclined at several tenths of a degree from the first predetermined angle can be a second angle. An angle inclined at several tenths of a degree from the first predetermined angle on the opposite side can be a third predetermined angle.

In another aspect of the tilt correcting apparatus of the present invention, the controlling device controls the correcting device such that the irradiation angle is set to be each of the plurality of predetermined angles before the record information is recorded at each of a plurality of different points for recording on the information recording surface, and the tilt determining device determines the amount of tilt for each of the plurality of points for recording.

According to this aspect, it is possible to determine the amount of tilt at the plurality of different points for recording of a radial direction position on the information recording surface. Therefore, the in-plane distribution of the amount of tilt which is generally constant or not uniform in the plane of the information recording surface, i.e., a "disc profile", or simply as a "profile" can be obtained. Incidentally, obtaining the in-plan distribution of the amount of tilt as described above is referred to as a "disc profile measurement", or simply as a "profile measurement". As described above, the amount of tilt is determined, not uniformly on the whole information recording surface, but by only a necessary amount at each point for recording. This allows the disc profile measurement. Moreover, the "radial direction position" in the present invention indicates where the radius from the center is equal on the information recording medium whose plane shape is circular, such as a disc-shaped medium. In other words, it means a position on a concentric circle on the surface of the information recording medium.

In another aspect of the tilt correcting apparatus of the present invention, the tilt correcting apparatus is further provided with: a RF detecting device for detecting a RF signal corresponding to the record information from the photo-detection signal; and a judging device for judging whether or not the RF signal is detected by the RF detecting device, the tilt determining device determining the amount of tilt on the basis of the detected wobble signal if it is judged that the RF signal is not detected, and determining the amount of tilt on the basis of the detected RF signal in place of the detected wobble signal if it is judged the RF signal is detected.

According to this aspect, if the information recording medium is already recorded at the detection position of a wobble signal where the amount of tilt is determined, for example, it is judged by the judging device that a RF signal is detected in accordance with the record information. Then, the amount of tilt is determined by the tilt determining device on the basis of the RF signal detected by the RF detecting device instead of the wobble signal. Namely, if a RF signal can be used, then, by using the RF signal, the amount of tilt can be determined at higher accuracy than the case where a wobble signal is used.

On the other hand, if the information recording medium is unrecorded at the detection position of a wobble signal where the amount of tilt is determined, for example, it is judged by the judging device that a RF signal is not detected in accordance with the record information. Then, the amount of tilt is determined by the tilt determining device on the basis of the wobble signal. Namely, if a RF signal can not be used, then, by using the wobble signal, the amount of tilt can be determined.

In another aspect of the tilt correcting apparatus of the present invention, the tilt determining device determines the amount of tilt, in consideration of a detection error in an optical detection system related to the tilt correcting apparatus.

According to this aspect, in determining the amount of tilt, consideration is given to the detection error (i.e. an offset) in the optical detection system related to the tilt correcting apparatus, such as an irradiation optical system from the light source to the information recording medium and a light receiving optical system from the information recording medium to the light receiving element. The detection error is peculiar to the optical system, so that it can be set in advance in the manufacturing test or before the shipment of the information recording apparatus or the information recording/reproducing apparatus. Alternatively, it can be detected after the shipment or at a user's place or the like, by using a recorded disc on which a RF signal can be detected stably or a disc for testing. In any case, the detection error is a known value at the time of detection of the tilt correction or at the time of tilt correction. By determining the amount of tilt in consideration of the detection error, it is possible to make a tilt correction at higher accuracy.

In another aspect of the tilt correcting apparatus of the present invention, the controlling device controls the correcting device in accordance with the amount of tilt, in consideration of a detection error in an optical detection system related to the tilt correcting apparatus.

According to this aspect, as in the above-mentioned aspect, the detection error is a known value at the time of detection of the tilt correction or at the time of tilt correction. By determining the amount of tilt in consideration of the detection error, it is possible to make a tilt correction at higher accuracy.

(Tilt Correcting Method)

The above object of the present invention can be also achieved by a tilt correcting method of making a tilt correction in an information recording apparatus or an information recording/reproducing apparatus capable of recording record information onto an information recording medium, on an information recording surface of which a track having a wobble is formed, by emitting laser light thereonto, the tilt correcting method being performed on a tilt correcting apparatus provided with a correcting device which can change an irradiation angle of the laser light with respect to the information recording medium, the tilt correcting method provided with: a first controlling process of controlling the correcting device such that the irradiation angle is each of a plurality of predetermined angles before the information recording apparatus or the information recording/reproducing apparatus records the record information; a wobble detecting process of detecting a wobble signal corresponding to the wobble from a photo-detection signal of light from the track caused by the laser light in such a condition that the irradiation angle is set to be each of the plurality of predetermined angles; a tilt determining process of determining an amount of tilt of the information recording surface with respect to the laser light, on the basis of the detected wobble signal; and a second controlling process of controlling the correcting device to correct the irradiation angle in accordance with the determined amount of tilt when the information recording apparatus or the information recording/reproducing apparatus records the record information.

According to the tilt correcting method, as in the case of the above-mentioned tilt correcting apparatus, even if a RF signal corresponding to the record information cannot be detected, the amount of tilt can be detected and a tilt correction can be made, quickly or highly accurately.

Incidentally, in response to various aspects in the above-mentioned tilt correcting apparatus of the present invention, the tilt correcting method of the present invention can also adopt various aspects.

(Information Recording Apparatus)

The above object of the present invention can be also achieved by an information recording apparatus provided with: the above-mentioned tilt correcting apparatus of the present invention (including its various aspects); and an optical writing device which has an irradiating device for irradiating the laser light and which writes the record information onto the information recording medium by using the laser light.

According to the information recording apparatus, it is provided with the tilt correcting apparatus of the present invention, so that with respect to the information recording medium which is unrecorded at a point for recording which is intended to detect the amount of tilt, the record information can be written by the optical writing device including an optical pickup, for example, while a tilt correction is made, quickly and highly accurately, by using a wobble signal.

(Information Recording/Reproducing Apparatus)

The above object of the present invention can be also achieved by an information recording/reproducing apparatus provided with: the above-mentioned tilt correcting apparatus of the present invention (including its various aspects); and an optical writing/reading device which has an irradiating device for irradiating the laser light and which selectively writes the record information onto or reads the record information from the information recording medium by using the laser light, the tilt determining device determining the amount of tilt on the basis of a detected RF signal in place of the detected wobble signal if the RF signal is detected from a photo-detection signal of light from the track read by the optical writing/reading device.

According to the information recording/reproducing apparatus, it is provided with the tilt correcting apparatus of the present invention, so that with respect to the information recording medium which is unrecorded at a point for recording which is intended to detect the amount of tilt, the record information can be written by the optical writing/reading device including an optical pickup, for example, while a tilt correction is made, quickly and highly accurately, by using a wobble signal. Moreover, with respect to the information recording medium which is already recorded at a point for recording which is intended to detect the amount of tilt, the record information can be written by the optical writing/reading device including an optical pickup, for example, while a tilt correction is made, quickly and at higher accuracy, by using a RF signal. Furthermore, with respect to the information recording medium which is already recorded, the record information can be read by the optical writing/reading device including an optical pickup, for example, while a tilt correction is made, quickly and at higher accuracy, by using a RF signal.

As explained in detail above, according to the tilt correcting apparatus, it is provided with: the correcting device; the controlling device; the wobble detecting device; and the tilt determining device. Moreover, according to the tilt correcting method, it is provided with: the first and second controlling processes; the wobble detecting process; and the tilt determining process. Thus, even if a RF signal corresponding to the record information cannot be detected, the amount of tilt can be detected and a tilt correction can be made, quickly or highly accurately. Moreover, according to the information recording apparatus or the information recording/reproducing apparatus, it is provided with the tilt correcting apparatus of the present invention, so that the record information can be written while a tilt correction is made, quickly and highly accurately, by using a wobble signal.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The embodiments of the present invention will be explained with reference to the drawings hereinafter.

First Embodiment

Figure 1:
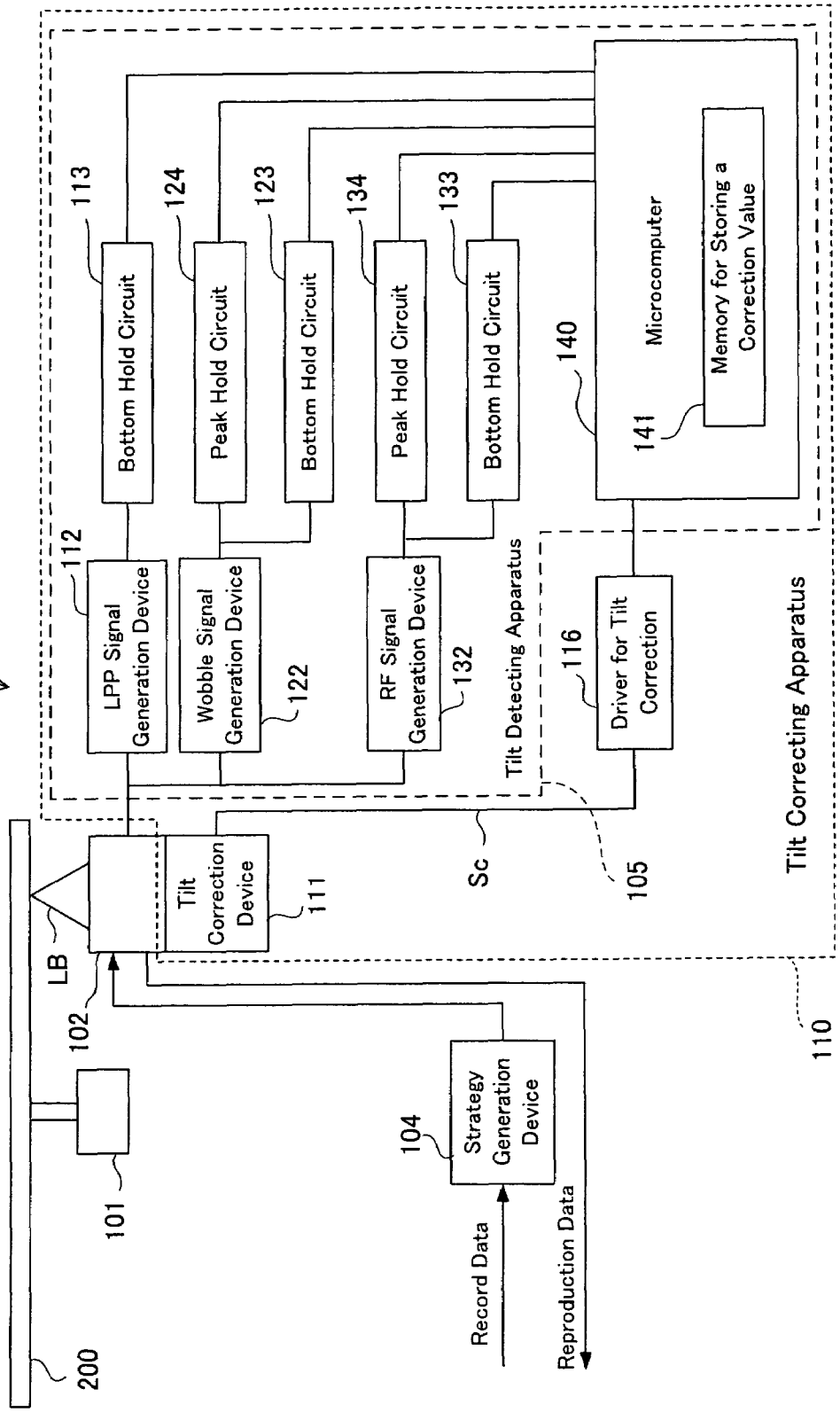
FIG. 1 is a block diagram showing a whole information recording/reproducing apparatus according to a first embodiment of the present invention.
Figure 2:
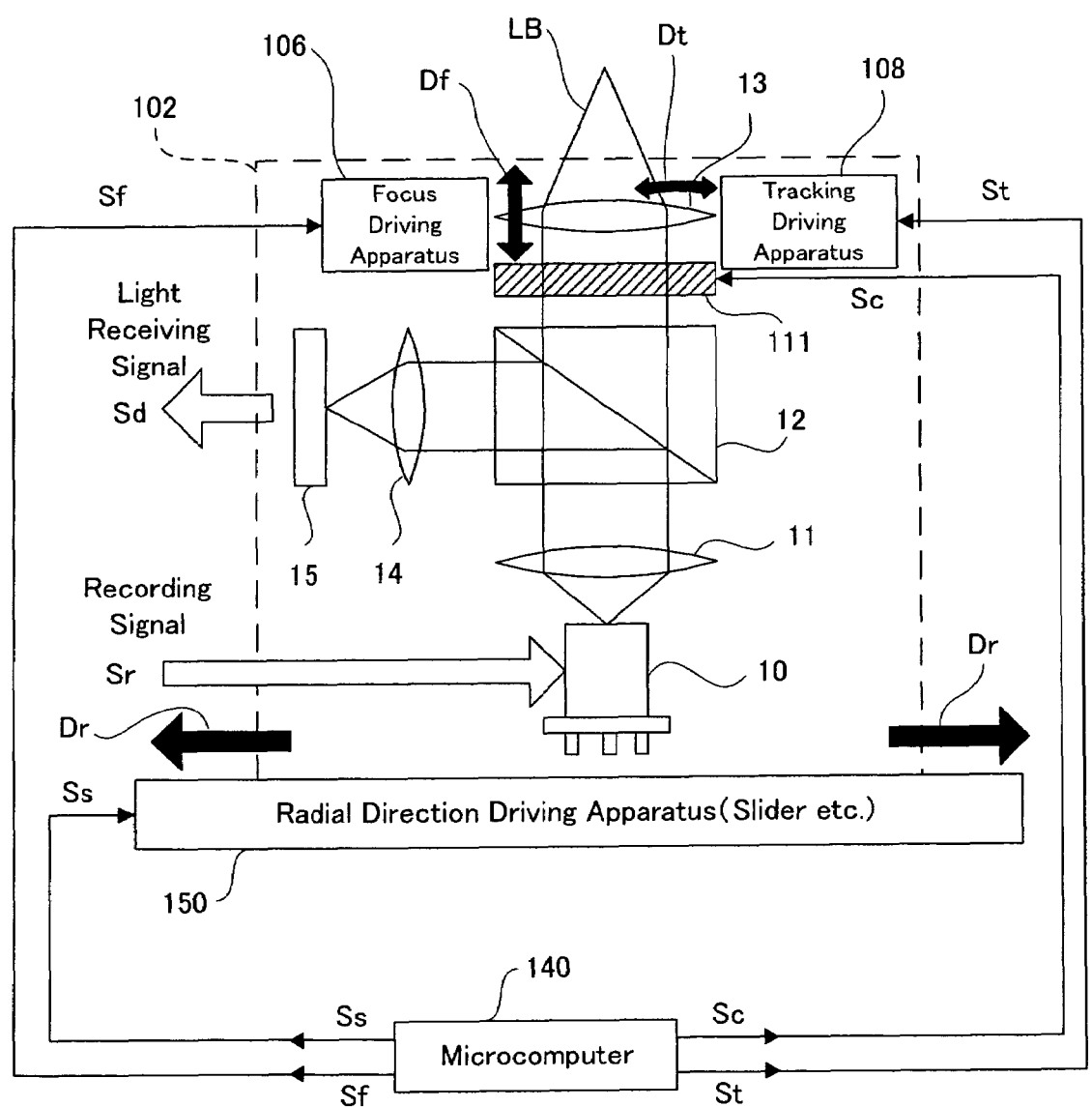
FIG. 2 is a block diagram showing a detailed structure about an optical pickup provided for the information recording/reproducing apparatus in the first embodiment.

At first, with reference to FIG. 1 and FIG. 2, the structure of an information recording/reproducing apparatus in the first embodiment of the present invention will be explained. FIG. 1 shows the whole block of the information recording/reproducing apparatus according to the first embodiment of the present invention. FIG. 2 shows a detailed structure about an optical pickup provided for the information recording/reproducing apparatus. In the first embodiment, the information recording/reproducing apparatus is provided with a tilt correcting apparatus including a tilt detecting apparatus according to the present invention, and is constructed as a DVD recorder, a DVD drive for a personal computer, or the like.

In FIG. 1, an information recording/reproducing apparatus 100 is provided with: a spindle motor 101; an optical pickup 102; a strategy generation device 104; and further, a tilt correcting apparatus 110 including a tilt detecting apparatus 105. The information recording/reproducing apparatus 100 can optically record the record information onto an optical disc 200, and can optically reproduce the record information from the optical disc 200.

The optical disc 200 is an information recording medium of a writable type, such as a DVD+RW, which uses phase change and optical magnetism, for example, or of an irreversible change recording type, such as a DVD+R, which uses laser heating. Moreover, tracks, such as groove tracks and land tracks, having a wobble are formed on the information recording surface. Furthermore, it is not limited to a single layer disc with one recording layer, but may be a multilayer disc with multiple recording layers.

The spindle motor 101 rotates the optical disc 200 which is loaded onto the information recording/reproducing apparatus 100, in a constant linear velocity (CLV) manner, in a constant angular velocity (CAV) manner, in a zone-CAV (ZCAV) manner, or the like. The number of rotations is controlled on the basis of, e.g., a wobble signal and a clock signal included in reproduction data, under the control of a microcomputer 140 or the like.

The optical pickup 102 irradiates the rotating optical disc 200 with laser light LB at the time of recording, to thereby optically record the record data, which is inputted through the strategy generation device 104, onto the optical disc 200. On the other hand, at the time of reproduction, the optical pickup 200 irradiates the rotating optical disc 200 with the laser light LB, to thereby optically reproduce the reproduction data from the optical disc 200.

As illustrated in FIG. 2, more specifically, the optical pickup 102 is provided with: a semiconductor laser 10; a condenser lens 11; a beam splitter 12; an objective lens 13; a condenser lens 14; and a light receiving element 15.

At the time of recording, the semiconductor laser 10 emits the laser light LB, which is generated and set at a power for recording by the strategy generation device 104 (refer to FIG. 1). Namely, the laser light LB is modulated in accordance with the record data at the power for recording. This laser light LB is emitted to the optical disc 200 through the lens 11, the beam splitter 12, and the objective lens 13. The optical pickup 102 is constructed to record the record data onto the optical disc 200 by the irradiation of the laser light LB.

On the other hand, at the time of reproduction, the semiconductor laser 10 emits the laser light LB, which is set at a relatively low power for reproduction. This laser light LB is emitted to the optical disc 200 through the lens 11, the beam splitter 12, and the objective lens 13. Moreover, its reflected light is received by the light receiving element 15 through the objective lens 13, the beam splitter 12, and the condenser lens 14, to thereby generate a light receiving signal (which is an example of "photo-detection signal") Sd. The optical pickup 102 is constructed to reproduce the record data from the optical disc 200, on the basis of the light receiving signal Sd, by the irradiation of the laser light LB.

At the time of such recording or reproduction, focus driving is performed in a direction as shown by an arrow Df, in response to a focus control signal Sf from the microcomputer 140 (or a focus servo apparatus), by a focus driving apparatus 106 which is provided with a focus actuator or the like for the optical pickup 102. For example, focus servo is performed such that the objective lens 13 is displaced in the optical axis direction of the laser light LB so as to reduce a focus error signal. On the other hand, tracking driving is performed in a direction as shown by an arrow Dt, in response to a tracking control signal St from the microcomputer 140 (or a tracking servo apparatus), by a tracking driving apparatus 108 which is provided with a tracking actuator or the like for the optical pickup 102. For example, tracking servo is performed such that the objective lens 13, or a part or all of the optical system of the optical pickup 102 is displaced in the radial direction of the optical disc 200 so as to reduce a tracking error signal. Moreover, radial direction displacement is performed in a direction as shown by an arrow Dr, in response to a displacement control signal Ss from the microcomputer 140, by a radial direction driving apparatus 150 which is provided with a slider or the like. For example, normal displacement at the time of recording or reproduction, or track jump is performed.

Particularly in the first embodiment, the optical pickup 102 is provided with a tilt correction device 111 which can change the irradiation angle of the laser light LB to the optical disc 200, namely, which can make a tilt correction. The tilt correction device 111 is provided with a liquid crystal correction element, for example, and cancels the coma aberration of the laser light LB by applying a voltage to the liquid crystal, in response to a tilt control signal Sc from the microcomputer 140, to thereby change the irradiation direction of the laser light LB within a slight angle range, such as several tenths of a degree and several degrees. Alternatively, the tilt correction device 111 may be provided with a movable device which is electric, electromagnetic, mechanical, or electromechanical, and which changes the irradiation axis of the laser light LB. For example, the tilt correction device 111 may be provided with an apparatus for tilting the optical pickup 102 by various actuators or an apparatus for tilting the objective lens 13. Moreover, the tilt correction device 111 can be shared with the tracking driving apparatus 108, at least partially.

In making such a tilt correction, the correction is made in accordance with the predetermined amount of tilt at each radial direction position of the optical disc 200 as described in detail later; namely, the correction is made in accordance with the disc profile of the optical disc 200 which is obtained in advance. By this, a tilt correction can be made accurately at any radial direction position of the optical disc 200. Incidentally, the tilt correction device 111 is used not only for the tilt correction at the time of actual recording of the record data or actual reproduction of the reproduction data, but also for the detection of the amount of tilt which is performed before the recording or reproduction, as described in detail later, in order to slightly change the irradiation angle of the laser light LB. In this sense, the tilt correction device 111 (and a driver 116 for tilt correction, as described later) also functions as a part of the tilt detecting apparatus 105.

Again in FIG. 1, the strategy generation device 104 implements a strategy to the record data, and generates a recording signal Sr. Specifically, the strategy generation device 104 generates the recording signal Sr corresponding to the record data so as to optimize jitter, signal strength, symmetry, or the like at the time of reproduction, and supplies it to the optical pickup 102.

The tilt correcting apparatus 110 is provided with: the tilt detecting apparatus 105; the driver 116 for tilt correction; and the tilt correction device 111 incorporated or built in the optical pickup 102 (refer to FIG. 2).

The tilt detecting apparatus 105 is provided with: a LPP signal generation device 112 for generating a land pre-pit (LPP) signal from a light receiving signal generated in the optical pickup 102; a wobble signal generation device 122 for generating a wobble signal from the light receiving signal; and a RF signal generation device 132 for generating a radio frequency (RF) signal from the light receiving signal. The tilt detecting apparatus 105 is further provided with: bottom hold circuits 113, 123, and 133; and peak hold circuits 124 and 134.

The bottom hold circuit 113 holds the signal voltage at a bottom level of a LPP signal generated by the LPP signal generation device 112. The bottom hold circuit 123 holds the signal voltage at a bottom level of a wobble signal generated by the wobble signal generation device 122. The bottom hold circuit 133 holds the signal voltage at a bottom level of a RF signal generated by the RF signal generation device 132. The peak hold circuit 124 holds the signal voltage at a peak level of a wobble signal generated by the wobble signal generation device 122. The peak hold circuit 134 holds the signal voltage at a peak level of a RF signal generated by the RF signal generation device 132.

The microcomputer 140 constitutes one example of the "controlling device" of the present invention. As described in detail later, under the control of the microcomputer 140, (i) the tilt detecting apparatus 105 detects the amount of tilt or performs a disc profile measurement before the information recording/reproducing apparatus 100 records the record data, and further (ii) the tilt correcting apparatus 110 makes a tilt correction when the information recording/reproducing apparatus 100 records the record data.

Figure 3:
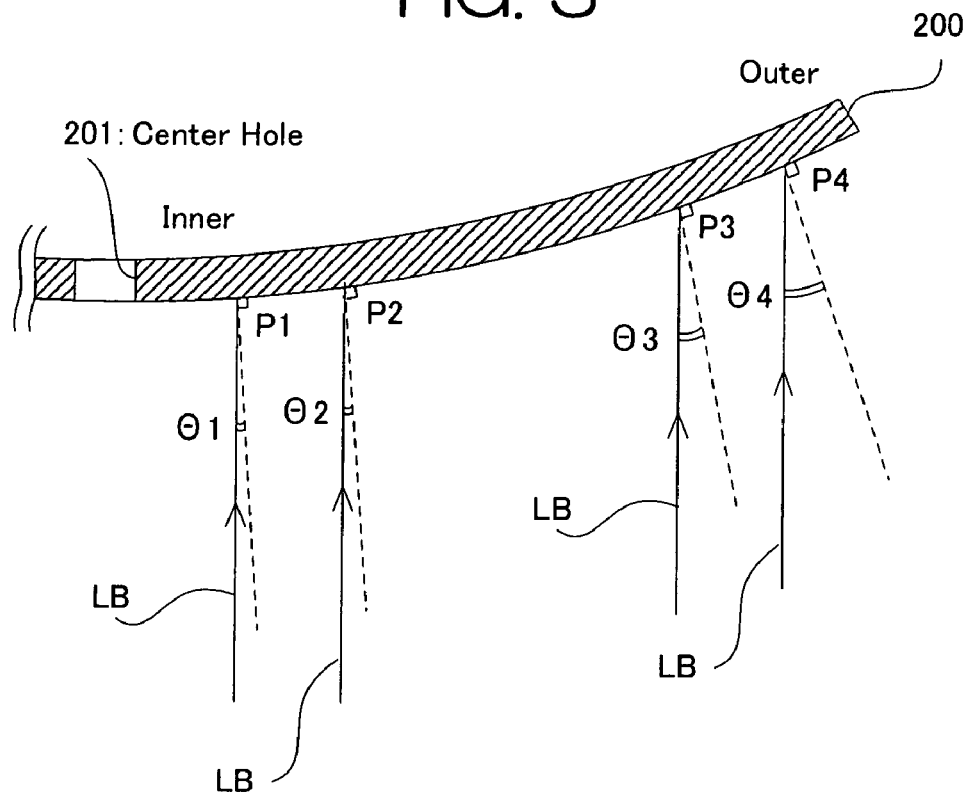
FIG. 3 is a partial cross sectional view showing an optical disc in the first embodiment if the optical disc is cut by a plane parallel to the central axis of the optical disc.

With reference to FIG. 3, the amount of tilt will be explained. FIG. 3 shows the partial cross section of the optical disc 200 if the optical disc 200 is cut by a plane parallel to the central axis.

In FIG. 3, the optical disc 200 extends in a disc shape from the inner to the outer circumferential side, with a center hole 201 as the center. The disc tilt (or inclination) increases toward the outer circumferential side. Namely, at a first tilt measurement point P1 which is the nearest to the inner circumferential side, the normal direction thereof is substantially equal to or matched with the irradiation direction of the laser light LB (in which, however, angle setting is performed so as to match the irradiation direction with the normal direction, with respect to the surface of the ideal optical disc 200 without tilt, in this case), and the amount of tilt θ1 made by them is extremely small. At a second tilt measurement point P2 which is the second nearest to the inner circumferential side, the amount of tilt θ2 is greater than the amount of tilt θ1. Moreover, at a third tilt measurement point P3 which is nearer to the outer circumferential side, the amount of tilt θ3 is fairly large. At a next fourth tilt measurement point P4, the amount of tilt θ4 is much greater than the amount of tilt θ3. As described above, the amount of tilt θ at each radial direction position on the surface of the optical disc 200 makes a function of a radius r, and is expressed as the amount of tilt θ(r). The amount of tilt θ(r) tends to increase greatly, towards the outer circumference of the optical disc 200. For example, at the most outer circumferential position of the optical disc 200 and at the fourth tilt measurement point P4, it could be several tenths of a degree or several degrees. Incidentally, in FIG. 3, the amount of tilt θ, which is the inclination of the surface of the optical disc 200, is defined on the basis of the normal direction of the surface of the optical disc 200. However, the amount of tilt θ may be defined as an angle made by the irradiation direction of the laser light LB and the ideal irradiation direction of the laser light LB which maximizes a RF signal if the RF signal is detected from the surface of the optical disc 200. In general, however, the ideal irradiation direction of the laser light LB is equal to the normal direction of the surface of the optical disc 200, so that the amount of tilt θ(r) will take the same value on the basis of any of them.

Again in FIG. 1, the microcomputer 140 stores the amount of tilt determined as described later (e.g. θ1 to θ4) or the disc profile (e.g. θ(r), wherein r: radius) into a memory 141 for storing a correction value. This amount of tilt is the same as a correction value to be tilted by the tilt correction device 111, which is necessary to match the laser light LB with the normal direction of the optical disc 200. Alternatively, the microcomputer 140 stores a correction value, which is determined depending on the amount of tilt, by the tilt correction device 111 for matching the irradiation direction of the laser light LB with a direction which maximizes the RF signal (however, this correction value will be the same as the amount of tilt if the normal direction of the optical disc 200 is equal to or matched with the irradiation direction which maximizes the RF signal, as can be clearly seen from FIG. 3).

In addition, when the information recording/reproducing apparatus 100 records the record data, the microcomputer 140 refers to the amount of tilt or the correction value which is stored in the memory 141 for storing a correction value, to thereby control the tilt correction device 111 through the driver 116 for tilt correction so as to correct the irradiation angle of the laser light LB in accordance with the predetermined amount of tilt as described in detail later. More specifically, the driver 116 for tilt correction generates a tilt control signal Sc corresponding to the determined amount of tilt so as to make the irradiation direction of the laser light LB close to or preferably to match it with the normal direction of the optical disc 200. Alternatively, the driver 116 for tilt correction generates a tilt control signal Sc corresponding to the determined amount of tilt so as to make the irradiation direction of the laser light LB close to or preferably to match it with the ideal irradiation direction of the laser light which maximizes a RF signal if the RF signal is detected from the surface of the optical disc 200. The tilt control signal Sc generated in this manner is supplied to the tilt correction device 111, to thereby make a tilt correction, quickly and highly accurately.

Figure 4:
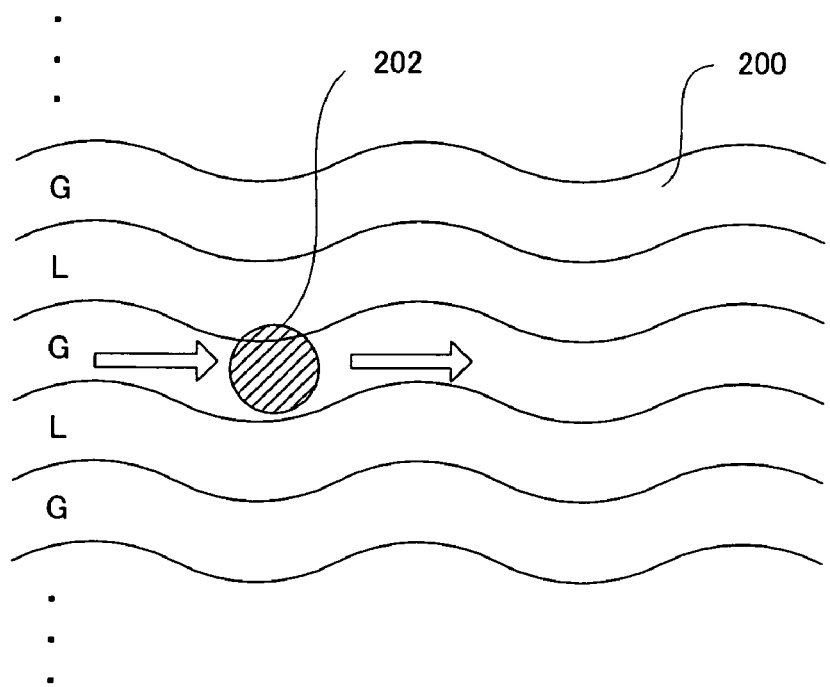
FIG. 4 is an enlarged plan view showing the optical disc in the first embodiment.
Figure 5:
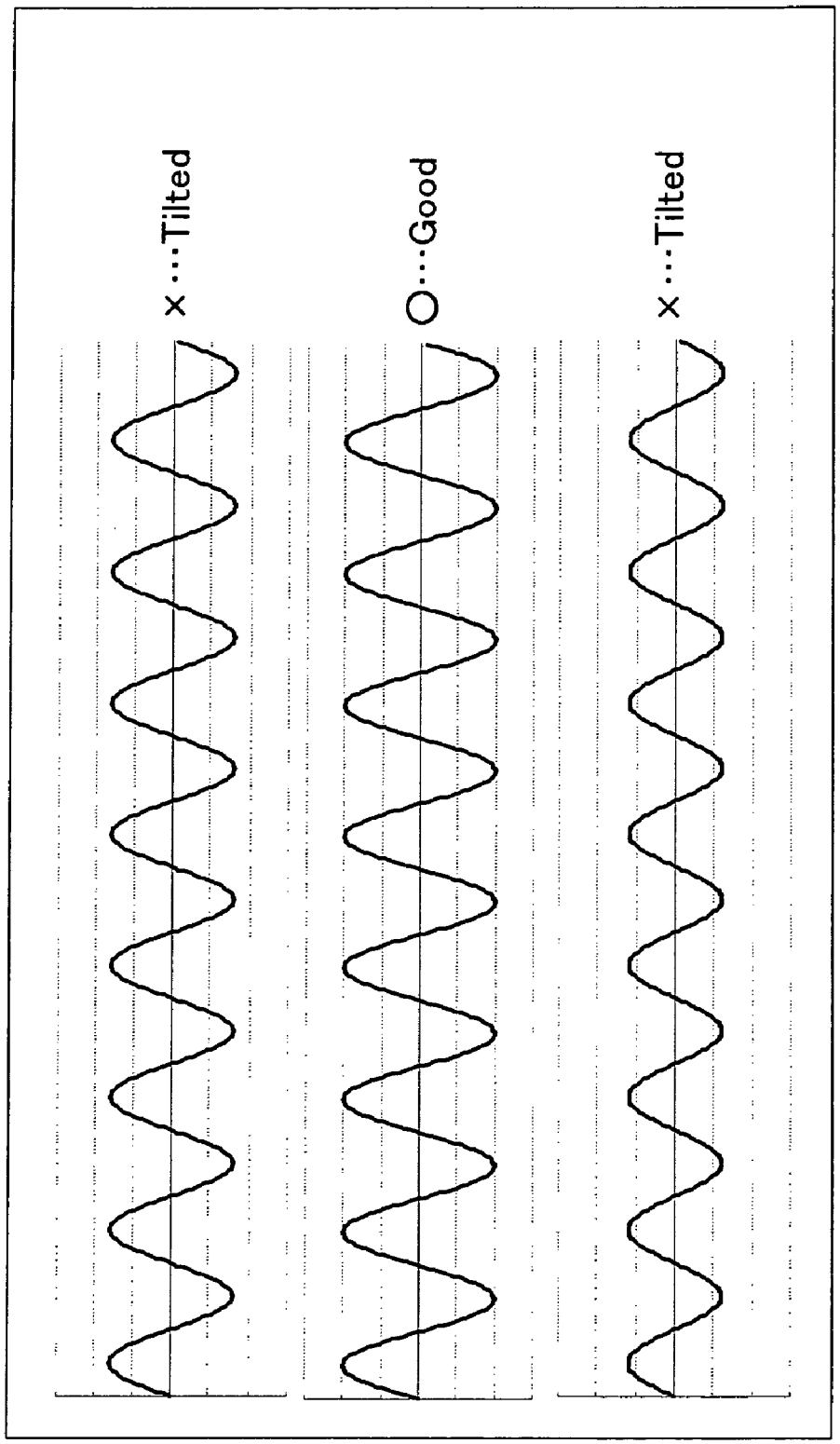
FIG. 5 is a wave-form chart showing the signal waveform of a wobble signal on a time axis, with or without tilt, in the first embodiment.
Figure 6:
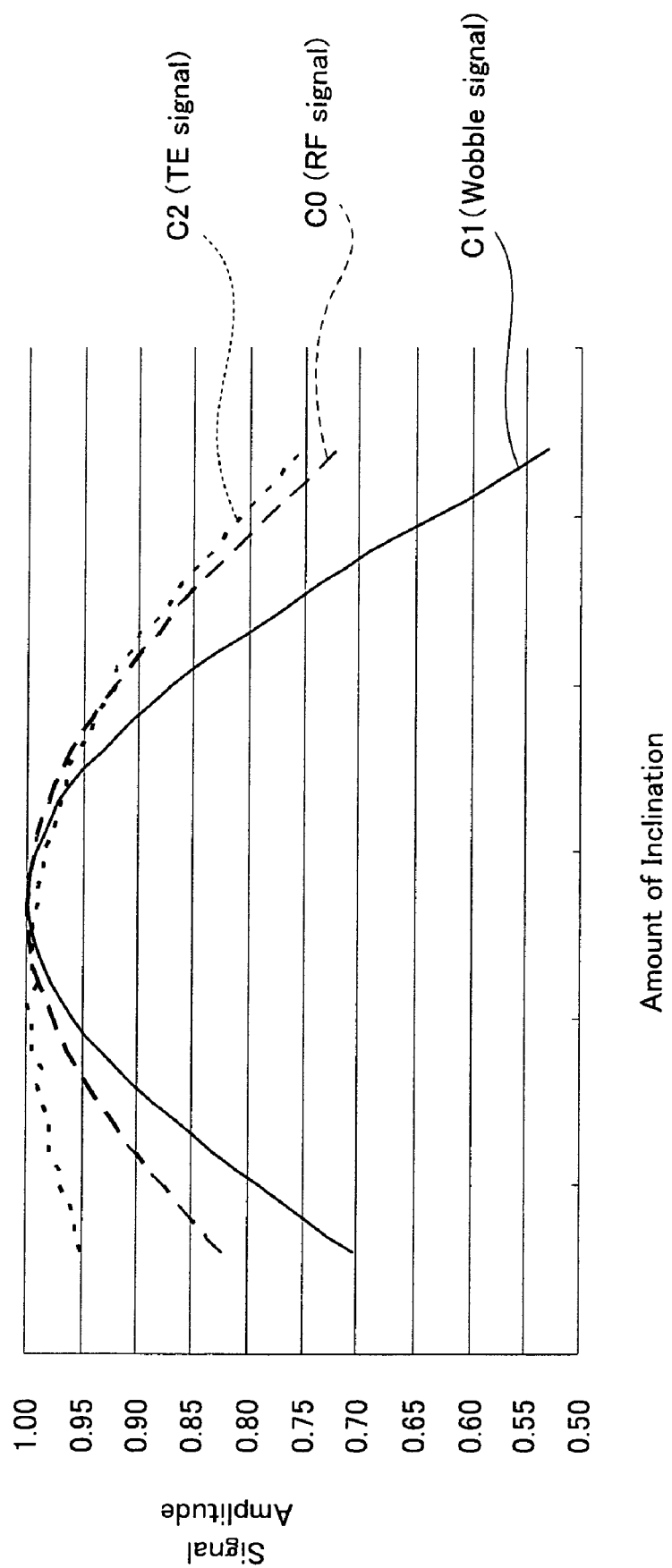
FIG. 6 is a feature diagram showing a change in a signal amplitude versus the amount of inclination in an irradiation direction of laser light, for a RF signal, a wobble signal, and a tracking error (TF) signal, as respective feature curves, in the first embodiment.

Next, with reference to FIG. 4 to FIG. 6, a method of determining the amount of tilt by using the amplitude of a wobble signal by the tilt detecting apparatus 105 will be explained. FIG. 4 schematically shows groove tracks G and land tacks L where a wobble is formed, on an enlarged plane of the recording surface of the optical disc 200. FIG. 5 shows the signal waveform of a wobble signal on a time axis, with or without tilt. FIG. 6 shows a change in a signal amplitude versus the amount of inclination in the irradiation direction of the laser light LB, for a RF signal, a wobble signal, and a tracking error (TF) signal, as respective feature curves.

As shown in FIG. 4, a light spot 202 is formed on the groove track G where the wobble is formed, by the laser light LB emitted form the optical pickup 102 shown in FIG. 1 and FIG. 2. Then, the light spot 202 is relatively displaced, as shown by an arrow in FIG. 4, along the groove track G with the rotation of the optical disc 200.

Then, as shown in each row of FIG. 5, a wobble signal is obtained in a light receiving signal generated by the light receiving element 15 of the optical pickup 102. Here, the wobble signal shown in the middle column of FIG. 5 shows a wobble signal obtained when the irradiation direction of the laser light LB is matched with the normal direction of the surface of the optical disc 200; i.e., in the ideal case. On the contrary, the wobble signal shown in either the upper or lower column of FIG. 5 shows a wobble signal obtained when the irradiation direction of the laser light LB is tilted, for example, at about several tenths of a degree, from the normal direction of the surface of the optical disc 200. As can be seen from FIG. 5, the tilt (or inclination) of the laser light LB reduces the amplitude of the wobble signal. Therefore, it can be said that on the contrary, if the amplitude of the wobble signal is the maximum, then, the irradiation direction of the laser light LB is equal to the normal direction of the disc surface on the light spot 202 caused by the laser light LB (refer to FIG. 4) at that time.

In the first embodiment, the amplitude of a wobble signal is obtained from the signal voltages at the bottom level and the peak level of the wobble signal, each of which is held by respective one of the bottom hold circuit 123 and the peak hold circuit 124 (refer to FIG. 1), and is used to obtain the amount of tilt.

As shown in FIG. 6, the amplitude of a wobble signal which is obtained in this manner, forms a quadric or parabolic feature curve C1 which opens to the lower side with a vertex obtained when the irradiation direction of the laser light LB has no inclination with respect to the amount of inclination from the normal direction of the disc surface.

Thus, in the tilt detection, at first, the laser spot 202 is stopped at one tilt measurement point whose radial direction position is fixed (e.g. any one of the first to fourth tilt measurement points P1 to P4 described in FIG. 3), under the control of the microcomputer 140 (in this case, a wobble signal is obtained since the optical disc 200 is rotating). The tilt correction device 111 is controlled to make a first irradiation direction, which is obtained when the laser light LB is emitted in such a standard condition that the application voltage to the liquid crystal of the tilt correction device 111 is made or set to be 0 (wherein the inclination to the normal direction of the surface of the optical disc 200 is regarded as the amount of inclination $\phi 1$), and the amplitude of a wobble signal is measured in this state. Then, with the laser spot 202 being stopped at the same radial direction position, the tilt correction device 111 is controlled to make a second irradiation direction, which is obtained when the laser light LB is emitted with it inclined at several tenths of a degree, for example, toward one side from the previous condition (wherein the inclination to the normal direction of the surface of the optical disc 200 is regarded as the amount of inclination $\phi 2$), and the amplitude of a wobble signal is measured in this state. Then, with the laser spot 202 being stopped at the same radial direction position, the tilt correction device 111 is controlled to make a third irradiation direction, which is obtained when the laser light LB is emitted with it inclined at several tenths of a degree, for example, toward the opposite side to the second irradiation direction from the previous condition (wherein the inclination to the normal direction of the surface of the optical disc 200 is regarded as the amount of inclination $\phi 3$), and the amplitude of a wobble signal is measured in this state.

By these, three points of (the amount of inclination $\phi 1$, a wobble signal amplitude A1), (the amount of inclination $\phi 2$, a wobble signal amplitude A2), and (the amount of inclination $\phi 3$, a wobble signal amplitude A3) are obtained as three coordinates which are supposed to locate on the graph shown in FIG. 6. Then, the three points are interpolated so as to make the feature curve C1 as shown in FIG. 6, or the feature curve C1 shown in FIG. 6 is obtained by approximation from the three points. The amount of inclination $\phi$ which gives a vertex (i.e. the maximum value or the greatest value) on the feature curve C1 obtained in this manner is determined as the amount of tilt $\theta$ at the tilt measurement point.

Incidentally, in the above-mentioned example, the irradiation direction of the laser light LB or the amount of inclination at one tilt measurement point whose radial direction position is fixed is changed three times, and the amplitude of a wobble signal is detected. Namely, the feature curve C1 shown in FIG. 6 is obtained by approximation using three points. However, it may be changed four times to detect the amplitude of a wobble signal. Namely, the feature curve C1 shown in FIG. 6 may be obtained by approximation using four points or more. Moreover, many wobble signals can be detected at one tilt measurement point, and out of them, the amount of inclination corresponding to a wobble signal with the maximum amplitude can be regarded as the amount of tilt.

In addition, although it depends on how to set the optical system in the optical pickup 102, if the amount of correction=0 by the tilt correction device 111, such as a liquid crystal correction element, the irradiation angle of the laser light LB often tends to be the amount of inclination near the vertexes of the feature curves C0 to C1. Therefore, if the amount of tilt is measured in the condition that the amount of correction=0 by the tilt correction device 111, and if the irradiation angle (i.e. the inclination) is changed at about several tenths of a degree from this point to the both sides to obtain the above-mentioned three points on the feature diagram, it is possible to approximate the feature curves C0 to C1, relatively quickly and easily, which is useful in practice. In the case where the amount of correction=0 by the tilt correction device 111, if the irradiation angle of the laser light LB is not the amount of inclination near the vertexes of the feature curves C0 to C1, i.e., if the irradiation direction is far away from the vertexes, then, the inclination is changed greatly from this, to thereby obtain the above-mentioned three points on the feature diagram. This is how to approximate the feature curves C0 to C1.

As described above, the amplitude of a wobble signal is measured by the above-mentioned three irradiation angles at the first tilt measurement point P1 as illustrated in FIG. 3, to thereby obtain the amount of tilt $\theta 1$ at the first tilt measurement point P1. In the same manner, the amplitude of a wobble signal is measured by the above-mentioned three irradiation angles at the second tilt measurement point P2, to thereby obtain the amount of tilt $\theta 2$. In the same manner, the amplitude of a wobble signal is measured by the above-mentioned three irradiation angles at each of the third and fourth tilt measurement points P3 and P4, to thereby obtain respective one of the amounts of tilt $\theta 3$ and $\theta 4$. By the amounts of tilt $\theta 1$ to and $\theta 4$ at the first to fourth tilt measurement points P1 to P4, the distribution of the amount of tilt at all the radial direction positions of the optical disc 200 is obtained by approximation or interpolation. Namely, the disc profile measurement is possible.

If the low accuracy is accepted, three or two tilt measurement points may be used. If the higher accuracy is desired, five or more tilt measurement points may be used.

The amount of tilt (e.g. $\theta 1$ to $\theta 4$ shown in FIG. 3) or the disc profile (e.g. $\theta(r)$ wherein r: radius) determined in the above manner is stored in the memory 141 for storing a correction value, which is built in the microcomputer 140, as shown in FIG. 1. When the information recording/reproducing apparatus 100 records the record data, the microcomputer 140 refers to the amount of tilt or the correction value stored in the memory 141 for storing a correction value, to thereby control the tilt correction device 111 through the driver 116 for tilt correction so as to correct the irradiation angle of the laser light LB in accordance with the predetermined amount of tilt (e.g. $\theta 1$ to $\theta 4$ shown in FIG. 3).

As explained in detail above, at the time of tilt detection, if only a wobble signal can be detected on the recordable optical disc 200, the highly accurate tilt detection is possible even without the detection of a RF signal and a tracking error signal. Moreover, at the time of subsequent recording of the record data, the quick and highly accurate tilt correction is possible.

Particularly, as shown in FIG. 6, it can be said that the feature curve C1 related to the amplitude of a wobble signal has an excellent measurement sensitivity, essentially, as compared to the feature curve C2 related to the amplitude of a tracking error (TE) signal. Namely, in FIG. 6, on each of the feature curves C0 to C1, the signal amplitude is normalized with the amplitude at the vertex as being 1.00. Thus, the amount of inclination which gives the vertex can be obtained at a higher accuracy by using the amplitude of a wobble signal having the feature curve C1, which has a steeper slope with the vertex as the center.

Moreover, as can be seen from FIG. 6, the amount of inclination which gives the vertex on the feature curve C0 related to the amplitude of a RF signal is relatively extremely close to the amount of inclination which gives the vertex on the feature curve C1 related to the amplitude of a wobble signal. On the other hand, the amount of inclination which gives the vertex on the feature curve C0 related to the amplitude of a RF signal relatively is relatively not so extremely close to the amount of inclination which gives the vertex on the feature curve C2 related to the amplitude of a tracking error signal. In addition to this, the irradiation angle of the laser light LB when a RF signal is the maximum is the ideal irradiation angle, or the target angle in the tilt correction. By this, it can be said that the use of a wobble signal is more advantageous than the use of a tracking error signal, for the tilt detection, in terms of more highly accurate tilt detection and tilt correction.

Figure 7:
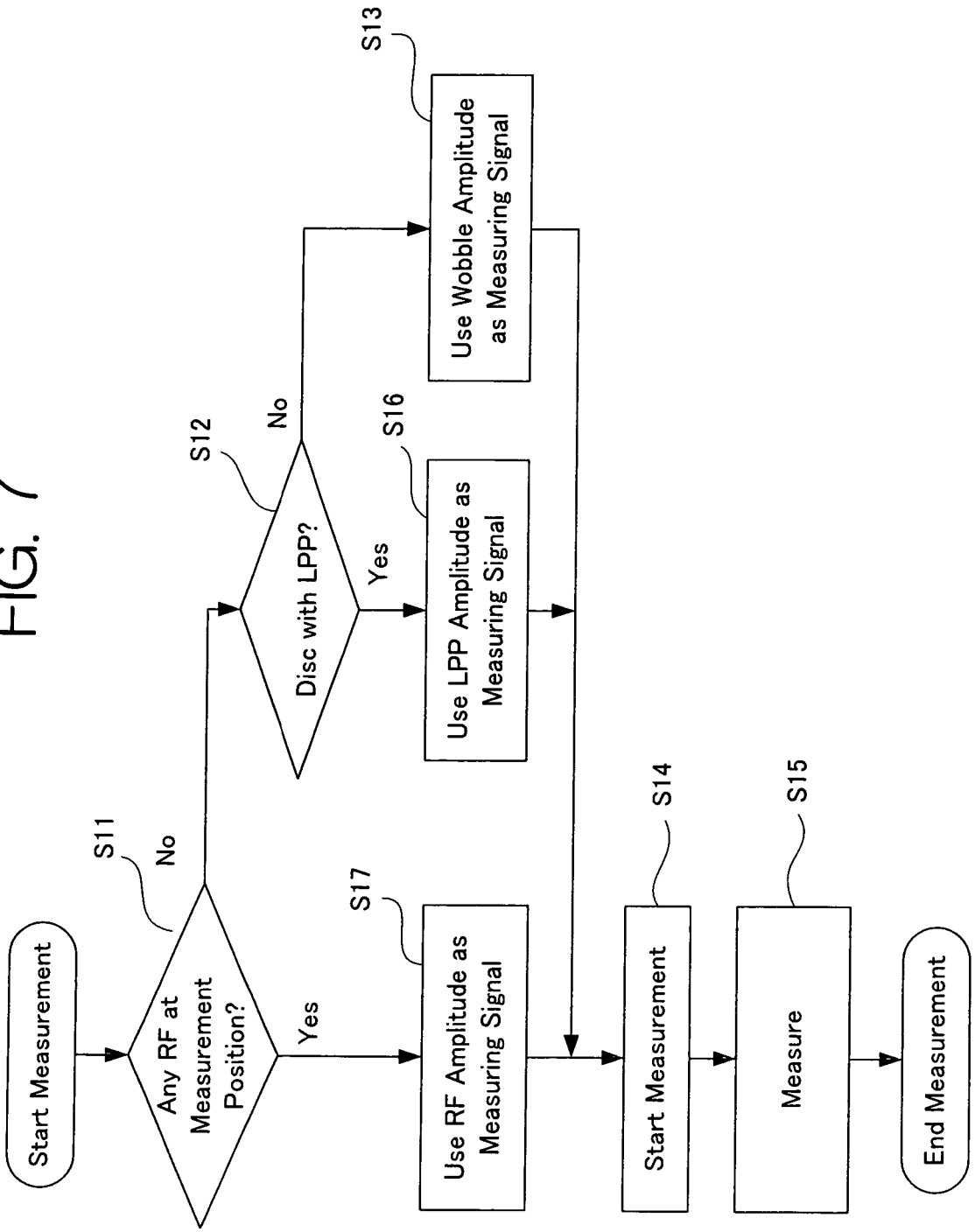
FIG. 7 is a flowchart showing an operation of measuring the amount of tilt of the optical disc by a tilt correcting apparatus in the first embodiment.

Next, with reference to FIG. 7, an operation of measuring the amount of tilt at each measurement position (e.g. any one of the first to fourth tilt measurement points P1 to P4 shown in FIG. 3) by the tilt correcting apparatus 110 will be explained. FIG. 7 is a flowchart showing an operation of measuring the amount of tilt of the optical disc 200 by the tilt correcting apparatus 110.

In FIG. 7, at first, the optical pickup 102 is displaced to a measurement position (e.g. the first tilt measurement point P1 in FIG. 3), and it is judged by the microcomputer 140 whether or not a RF signal can be generated by the RF signal generation device 132 (refer to FIG. 1) from a light receiving signal based on the laser light LB (step S11). Namely, it is judged whether or not record data is already recorded at the measurement position on the recordable optical disc 200.

If a RF signal is not detected from the measurement position (the step S11: No), then, it is further judged by the microcomputer 140 whether or not a LPP signal can be generated by the LPP signal generation device 112 (refer to FIG. 1) from the light receiving signal based on the laser light LB (step S12). Namely, it is judged whether or not a LPP is already recorded at the measurement position on the recordable optical disc 200.

If a LPP signal is not detected from the measurement position (the step S12: No), the amplitude of a wobble signal is used as a measuring signal (step S13), and the measurement of the amplitude of a wobble signal is started, as explained with reference to FIG. 3 to FIG. 6 (step S14). For example, while the optical disc 200 rotates five times, the peak value and the bottom value of a wobble signal are detected by the bottom hold circuit 123 and the peak hold circuit 124 (refer to FIG. 1), and the amplitude of a wobble signal is measured as a difference of those values. Moreover, while the irradiation angle of the laser light LB is changed by the tilt correction device 111, the measurement of the amplitude of a wobble signal is continued at the relevant measurement position (step S15).

On the other hand, in the judgment of the step S12, if a LPP signal is detected from the measurement position (the step S12: Yes), the amplitude of a LPP signal is used as a measuring signal (step S16), and the measurement of the amplitude of a LPP signal is started (the step S14). Moreover, while the irradiation angle of the laser light LB is changed by the tilt correction device 111, the measurement of the amplitude of a LPP signal is continued at the relevant measurement position (the step S15).

On the other hand, in the judgment of the step S11, if a RF signal is detected from the measurement position (the step S11: Yes), the amplitude of a RF signal is used as a measuring signal (step S17), and the measurement of the amplitude of a RF signal is started (the step S14). For example, while the optical disc 200 rotates five times, the peak value and the bottom value of a RF signal are detected by the bottom hold circuit 133 and the peak hold circuit 134 (refer to FIG. 1), and the amplitude of a RF signal is measured as a difference of those values. Moreover, while the irradiation angle of the laser light LB is changed by the tilt correction device 111, the measurement of the amplitude of a RF signal is continued at the relevant measurement position (the step S15).

Then, the tilt measurement at one measurement position is completed. Particularly in the first embodiment, even in the case of the optical disc 200 which is recordable and unrecorded and on which a LPP is not formed in advance, the amplitude of a wobble signal can be detected in the steps S13 to S15, and on the basis of this, the amount of tilt can be determined, as described above (refer to FIG. 6 etc.), so that it is extremely useful. In addition, if the optical disc is already recorded and a RF signal can be used thereon, the amplitude of the RF signal can be measured, and on the basis of this, the amount of tilt can be determined, so that it is further useful. Namely, if a RF signal can be used, then, by using this, the tilt detection can be performed at higher accuracy. Incidentally, in this case, by obtaining the feature curve C0 shown in FIG. 6, the amount of tilt can be determined in the same manner as in using a wobble signal. Moreover, if the optical disc 200 is unrecorded or already recorded and if a RF signal cannot be used but a LPP signal can be used thereon, then, the tilt detection is performed by measuring the LPP signal, so that it is further useful.

In the first embodiment, however, regardless of the presence of a LPP signal, a RF signal or a wobble signal may be measured. Namely, the steps S12 and S16 can be removed in FIG. 7. Moreover, regardless of the presence of a RF signal and a LPP signal, a wobble signal may be always measured.

In any case, in the measurement of a wobble signal in the steps S13 to S15, for example, the measurement can be performed without a necessity to open and close tracking servo, as compared to the case where a tracking error signal is used. For example, it takes about 500 msec to open and close the tracking servo at one measurement position. Then, in order to eventually perform the disc profile measurement as shown in FIG. 3, it takes about 4×500 msec=2 sec in using the tracking servo. On the other hand, in the first embodiment, it is unnecessary to open and close the tracking servo, this time length is not required. As described above, in the first embodiment in which a wobble signal is used, the tilt detection can be performed, extremely quickly, as compared to the case where a tracking error signal is used.

Second Embodiment

Figure 8:
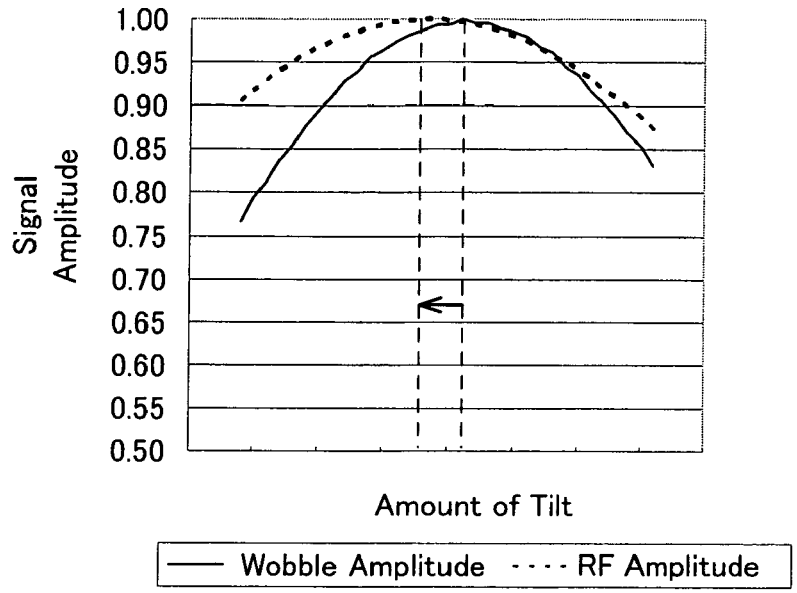
FIG. 8 is one feature diagram showing an "offset" caused if various optical pickups are used, in a second embodiment of the present invention.
Figure 9:
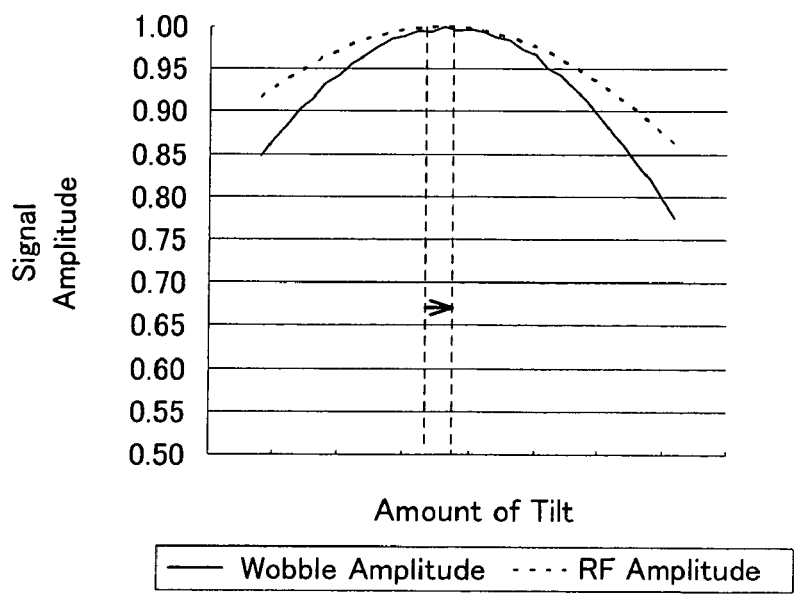
FIG. 9 is another feature diagram showing the "offset" caused if various optical pickups are used, in the second embodiment.
Figure 10:
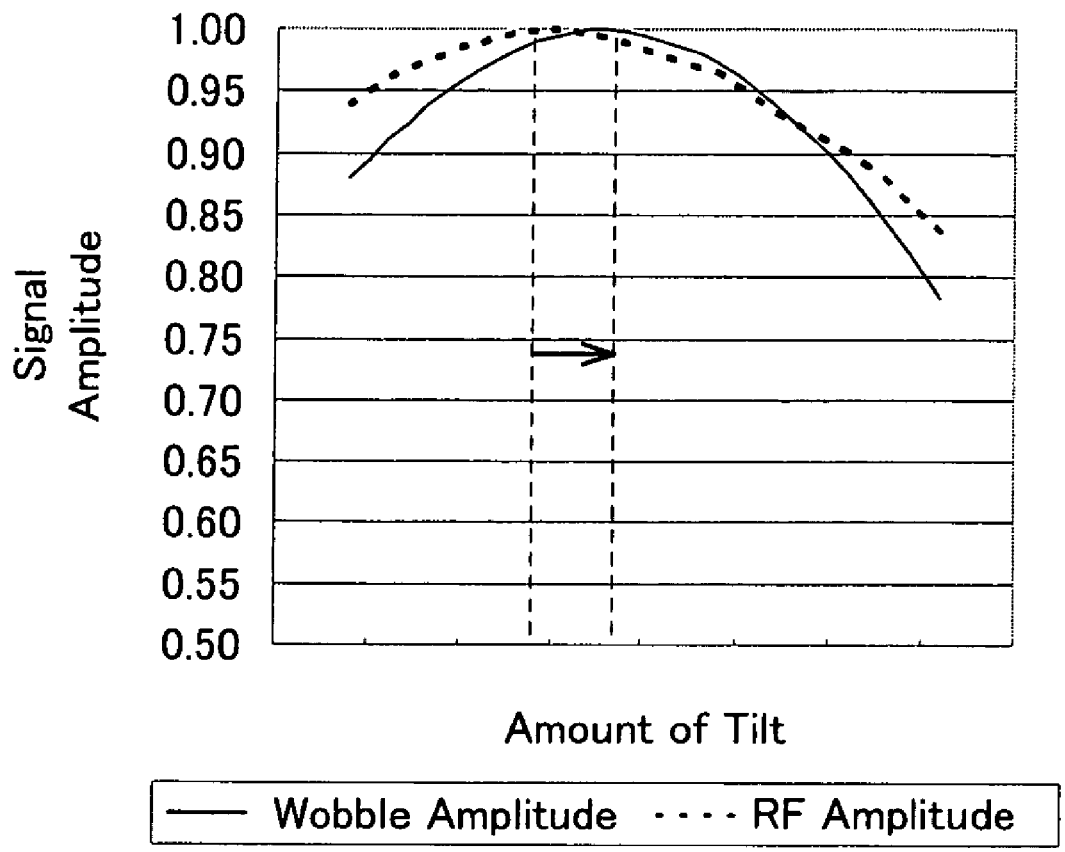
FIG. 10 is another feature diagram showing the "offset" caused if various optical pickups are used, in the second embodiment.
Figure 11:
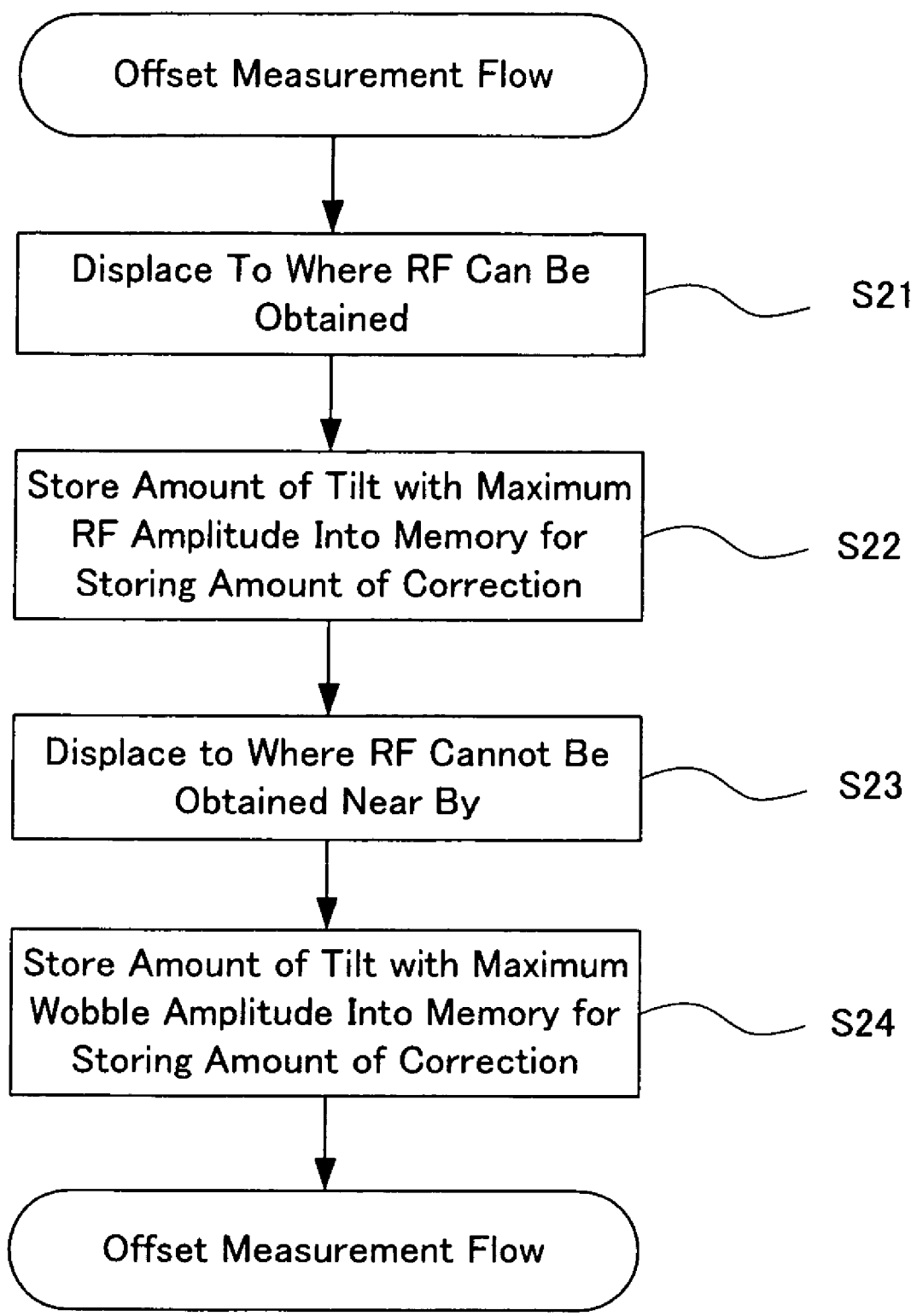
FIG. 11 is a flowchart in measuring such an offset in the second embodiment.

Next, with reference to FIG. 8 to FIG. 11, an information recording/reproducing apparatus in the second embodiment of the present invention will be explained. FIG. 8 to FIG. 10 are feature diagrams showing an "offset" caused between the detection of the amount of tilt by a wobble signal and the detection of the amount of tilt by a RF signal if various optical pickups are used. FIG. 11 is a flowchart in measuring such an offset in the second embodiment.

The structure and the operation in the second embodiment are substantially the same as those in the above-mentioned first embodiment. In the second embodiment, the offset is measured in advance in the optical system which constitutes the information recording/reproducing apparatus 100, and in consideration of this, the amount of tilt can be determined or a tilt correction can be made. Hereinafter, these points, which are different from the first embodiment, will be explained. Here, the "offset" means a difference (a difference shown by an arrow in each of FIG. 8 to FIG. 10) between the amount of tilt which is determined as the vertex of the feature curve C1 (refer to FIG. 6) in using a wobble signal and the amount of tilt which is determined as the vertex of the feature curve C0 (refer to FIG. 6) in using a RF signal. Such an offset is considered to be peculiar to the optical system which constitutes the optical pickup 102, such as the objective lens 13, the beam splitter 12, and the tilt correction device 111 like a liquid crystal correction element. Namely, regardless of the individual optical disc 200 which is loaded at the time of recording or reproduction, the offset can be set in advance as a peculiar value to the information recording/reproducing apparatus 100.

As shown in FIG. 8 to FIG. 10, the optical pickup 102 has the offset peculiar to the individual optical pickup 102 because of manufacturing variations and adjustment variations or the like. Thus, in the second embodiment, the offset is measured in advance in the following manner.

In FIG. 11, as an initial state, a recorded disc on which a RF signal can be used or a recorded test-only disc is loaded onto the information recording/reproducing apparatus 100. In this state, the irradiation position of the laser light LB is displaced to a recorded radial direction position where a RF signal can be obtained (step S21). Then, with the radial direction position fixed, the amplitude of a RF signal is measured. At this time, the irradiation angle is changed three times by the tilt correction device 111, and the measurement is performed in each case. Then, the amount of tilt with the maximum amplitude of a RF signal is determined from the feature curve C0, and this value is stored into the memory 141 for storing the amount of correction (step S22).

Next, the irradiation position of the laser light LB is displaced to an unrecorded radial direction position where a RF signal cannot be obtained near by (step S23). Then, with the radial direction position fixed, the amplitude of a wobble signal is measured. At this time, the irradiation angle is changed three times by the tilt correction device 111, and the measurement is performed in each case. Then, the amount of tilt with the maximum amplitude of a wobble signal is determined from the feature curve C1, and this value is stored into the memory 141 for storing the amount of correction (step S24).

Then, the offset measurement is completed. If (i) the amount of tilt with the maximum amplitude of a RF signal and (ii) the amount of tilt with the maximum amplitude of a wobble signal are stored in the memory 141 for storing the amount of correction, the offset can be calculated as a difference of them, quickly and easily. Thus, it is unnecessary to store the offset value itself. However, in place of or in addition to these values, the offset value itself may be stored in the memory 141 for storing the amount of correction. Moreover, the offset may be treated as a peculiar value to the optical pickup 102 which does not depend on the radial direction position (i.e. a single value which does not depend on the radial direction position), or as a peculiar value to the optical pickup 102 which varies more or less depending on the radial direction position (i.e. a plurality of values which depend on the radial direction position).

According to the second embodiment, the offset is measured in advance as described above, so that in the subsequent determination of the amount of tilt by the tilt detecting apparatus 105, the memory 141 for storing the amount of correction is referred to, to thereby determine the amount of tilt in consideration of the offset measured in advance. Alternatively, the offset is measured in advance as described above, so that in the subsequent tilt correction by the tilt correcting apparatus 110, the memory 141 for storing the amount of correction is referred to, to thereby make a tilt correction in consideration of the offset measured in advance. By these, according to the second embodiment, even if the offset is clearly present, the highly accurate tilt detection and tilt correction can be performed.

Third Embodiment

Figure 12:
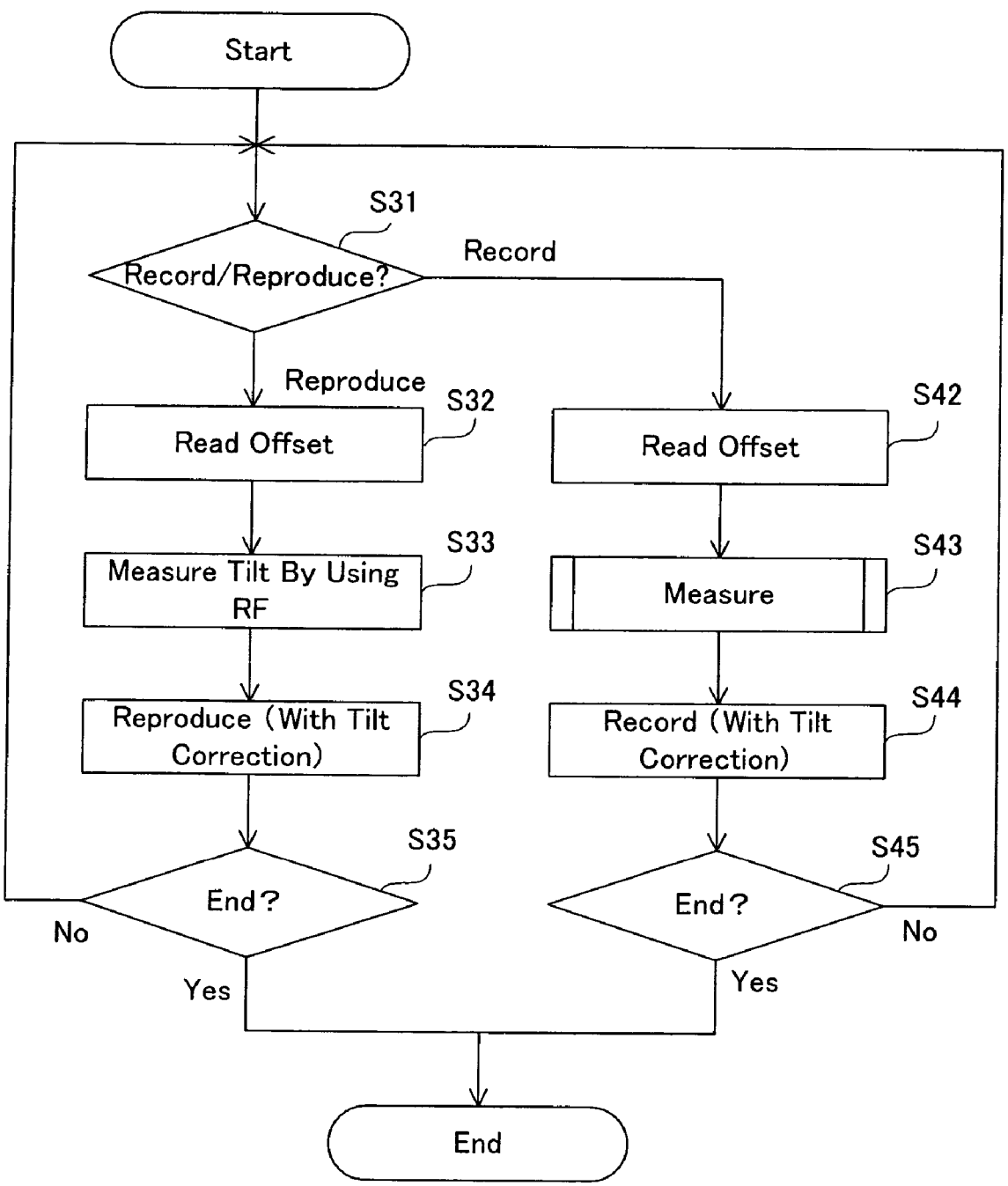
FIG. 12 is a flowchart in recording or reproducing record data in a third embodiment of the present invention.

Next, with reference to FIG. 12, an information recording/reproducing apparatus in the third embodiment of the present invention will be explained. FIG. 12 is a flowchart in recording or reproducing record data.

The structure and the operation in the third embodiment are substantially the same as those in the above-mentioned first embodiment. Moreover, in the third embodiment, the offset measurement is performed in advance, as in the second embodiment. Particularly in the third embodiment, it is judged whether or not the record data is recorded onto or reproduced from the optical disc 200, and in accordance with the judgment result, the tilt detection and the tilt correction are performed by using a RF signal, or the tilt detection and the tilt correction are performed by using a wobble signal etc. Hereinafter, these points which are different from the first or second embodiment will be explained.

In FIG. 12, at first, it is judged whether the record data is recorded onto or reproduced from the optical disc 200 which is loaded onto the information recording/reproducing apparatus 100 (step S31). In the case of recording (the step S31: Record), an offset value measured in the same manner as in the second embodiment is read from the memory 141 for storing the amount of correction. Alternatively, an offset is obtained as a difference between (i) the amount of tilt with the maximum amplitude of a RF signal and (ii) the amount of tilt with the maximum amplitude of a wobble signal (step S42). Then, the same measurement as in the steps S11 to S15 shown in FIG. 7 is performed at a plurality of tilt measurement points. By this, the amount of tilt is determined and the disc profile measurement is performed (step S43).

Then, the record data is recorded while a tilt correction is made in accordance with the amount of tilt or the disc profile which is determined. Therefore, if there is no RF signal, on the basis of the amount of tilt and the offset which are obtained by using a wobble signal, the recording is performed while a tilt correction is made, highly accurately. Alternatively, if there is a RF signal, the recording is performed while a tilt correction is made, highly accurately, on the basis of the RF signal (step S44). Then, it is judged whether or not a command for indicating to end is inputted (step S45). If it is to be ended (the step S45: Yes), a series of processing is ended.

On the other hand, in the case of reproduction in the judgment of the step S31 (the step S31: Reproduce), an offset value measured in the same manner as in the second embodiment is read from the memory 141 for storing the amount of correction. Alternatively, an offset is obtained as a difference between (i) the amount of tilt with the maximum amplitude of a RF signal and (ii) the amount of tilt with the maximum amplitude of a wobble signal (step S32). Then, in this case, since there is a RF signal on the recorded optical disc 200, the amplitude of a RF signal is measured at a plurality of tilt measurement points, as in the steps S17, S14, and S15 shown in FIG. 7. By this, the amount of tilt is determined and the disc profile measurement is performed (step S33).

Then, the record data is reproduced while a tilt correction is made in accordance with the amount of tilt or the disc profile which is determined. Therefore, since a RF signal can be used in the reproduction, the reproduction is performed while a tilt correction is made, highly accurately, on the basis of the RF signal (step S34). Then, it is judged whether or not a command for indicating to end is inputted (step S35). If it is to be ended (the step S35: Yes), a series of processing is ended.

On the other hand, if it is not to be ended in the step S35 or S45 (the step S35: No or S45: No), the operational flow returns to the step S31.

As described above, according to the third embodiment, the tilt correcting apparatus 110 is provided, so that with respect to the optical disc 200 which is unrecorded at the tilt measurement point, the record data can be written by the optical pickup 102 while a tilt correction is made by using a wobble signal, quickly and highly accurately. Moreover, with respect to the optical disc 200 which is recorded at the tilt measurement point, the record data can be written by the optical pickup 102 while a tilt correction is made by using a RF signal, quickly and highly accurately.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-193423 filed on Jun. 30, 2004 including the specification, claims, drawings and summary is incorporated herein by reference in its entirety.

What is claimed is:

1. A tilt correcting apparatus for tilt correction in an information recording apparatus or an information recording/reproducing apparatus capable of recording information onto an information recording medium, on an information recording surface of which a track having a wobble is formed, by emitting laser light thereonto, said tilt correcting apparatus comprising:
a correcting device for changing an irradiation angle of the laser light with respect to the information recording medium;
a controlling device for controlling said correcting device such that the irradiation angle is set to be each of a plurality of predetermined angles before the information recording apparatus or the information recording/reproducing apparatus records information;
a wobble detecting device for detecting a wobble signal corresponding to wobble from a photo-detection signal of light from the track caused by the laser light in such a condition that the irradiation angle is set to be each of the plurality of predetermined angles;
an RF detecting device for detecting an RF signal corresponding to recorded information from a photo-detection signal; and
a tilt determining device for determining an amount of tilt of the information recording surface with respect to the laser light, on the basis of the detected wobble signal and on an offset obtained as a difference between an amount of tilt for maximum amplitude of the RF signal and an amount of tilt for maximum amplitude of the wobble signal,
said controlling device controlling said correcting device to correct the irradiation angle in accordance with the amount of tilt determined by said tilt determining device when the information recording apparatus or the information recording/reproducing apparatus records information,
said controlling device controlling said correcting device in accordance with the amount of tilt, in consideration of the offset.

2. The tilt correcting apparatus according to claim 1, wherein said correcting device includes a liquid crystal correction element located in an optical path of the laser light.

3. The tilt correcting apparatus according to claim 1, wherein said correcting device corrects the irradiation angle so as to make an irradiation direction and a normal direction of the information recording surface be close to each other.

4. The tilt correcting apparatus according to claim 1, wherein said correcting device corrects the irradiation angle so as to make an irradiation direction and an ideal irradiation direction of laser light, which maximizes a RF (Radio Frequency) signal assuming that the RF signal is detected from the information recording surface, be close to each other.

5. The tilt correcting apparatus according to claim 1, wherein
said controlling device controls said correcting device such that the plurality of predetermined angles are three predetermined angles, and
said tilt determining device obtains a feature curve of an amplitude of wobble signal versus irradiation angle, from three wobble signals corresponding to the three predetermined angles, and thereby determines the amount of tilt from an irradiation angle value which gives a maximum value on the obtained feature curve.

6. The tilt correcting apparatus according to claim 1, wherein
said controlling device controls said correcting device such that the irradiation angle is set to be each of the plurality of predetermined angles before information is recorded at each of a plurality of different points for recording on the information recording surface, and
said tilt determining device determines the amount of tilt for each of the plurality of points for recording.

7. The tilt correcting apparatus according to claim 1, further comprising:
a judging device for judging whether or not the RF signal is detected by said RF detecting device,
said tilt determining device determining the amount of tilt on the basis of the detected wobble signal if the judging device judges that the RF signal is not detected, and determining the amount of tilt on the basis of the detected RF signal in place of the detected wobble signal if the judging device judges that the RF signal is detected.

8. A tilt correcting method for tilt correction in an information recording apparatus or an information recording/reproducing apparatus capable of recording information onto an information recording medium, on an information recording surface of which a track having a wobble is formed, by emitting laser light thereonto, said tilt correcting method being performed on a tilt correcting apparatus comprising a correcting device which can change an irradiation angle of the laser light with respect to the information recording medium, said tilt correcting method comprising:
a first controlling process for controlling said correcting device such that the irradiation angle is set to be each of a plurality of predetermined angles before the information recording apparatus or the information recording/reproducing apparatus records information;
a wobble detecting process for detecting a wobble signal corresponding to wobble from a photo-detection signal of light from the track caused by the laser light in such a condition that the irradiation angle is set to be each of the plurality of predetermined angles;

an RF detecting process for detecting an RF signal corresponding to recorded information from a photo-detection signal; and a tilt determining process for determining an amount of tilt of the information recording surface with respect to the laser light, on the basis of the detected wobble signal and on an offset obtained as a difference between an amount of tilt for maximum amplitude of the RF signal and an amount of tilt for maximum amplitude of the wobble signal; and a second controlling process for controlling said correcting device to correct the irradiation angle in accordance with the amount of tilt determined by the tilt determining process when the information recording apparatus or the information recording/reproducing apparatus records the record information, said second controlling process controlling said correcting device in accordance with the amount of tilt, in consideration of the offset.

9. An information recording apparatus comprising (i) a tilt correcting apparatus for tilt correction in an information recording apparatus or an information recording/reproducing apparatus capable of recording information onto an information recording medium, on an information recording surface of which a track having a wobble is formed, by emitting laser light thereonto, said tilt correcting apparatus comprising:

a correcting device for changing an irradiation angle of the laser light with respect to the information recording medium;

a controlling device for controlling said correcting device such that the irradiation angle is set to be each of a plurality of predetermined angles before the information recording apparatus or the information recording/reproducing apparatus records information;

a wobble detecting device for detecting a wobble signal corresponding to wobble from a photo-detection signal of light from the track caused by the laser light in such a condition that the irradiation angle is set to be each of the plurality of predetermined angles;

an RF detecting device for detecting an RF signal corresponding to recorded information from a photo-detection signal; and a tilt determining device for determining an amount of tilt of the information recording surface with respect to the laser light, on the basis of the detected wobble signal and on an offset obtained as a difference between an amount of tilt for maximum amplitude of the RF signal and an amount of tilt for maximum amplitude of the wobble signal, said controlling device controlling said correcting device to correct the irradiation angle in accordance with the amount of tilt determined by said tilt determining device when the information recording apparatus or the information recording/reproducing apparatus records information, said controlling device controlling said correcting device in accordance with the amount of tilt, in consideration of the offset, and (ii) an optical writing device comprising an irradiating device for irradiating the laser light and which writes the record information onto the information recording medium by using the laser light.

10. An information recording/reproducing apparatus comprising (i) a tilt correcting apparatus for making a tilt correction in an information recording apparatus or an information recording/reproducing apparatus capable of recording information onto an information recording medium, on an information recording surface of which a track having a wobble is formed, by emitting laser light thereonto, said tilt correcting apparatus comprising:

a correcting device for changing an irradiation angle of the laser light with respect to the information recording medium;

a controlling device for controlling said correcting device such that the irradiation angle is set to be each of a plurality of predetermined angles before the information recording apparatus or the information recording/reproducing apparatus records information;

a wobble detecting device for detecting a wobble signal corresponding to wobble from a photo-detection signal of light from the track caused by the laser light in such a condition that the irradiation angle is set to be each of the plurality of predetermined angles;

an RF detecting device for detecting an RF signal corresponding to recorded information from a photo-detection signal; and a tilt determining device for determining an amount of tilt of the information recording surface with respect to the laser light, on the basis of the detected wobble signal and on an offset obtained as a difference between an amount of tilt for maximum amplitude of the RF signal and an amount of tilt for maximum amplitude of the wobble signal, said controlling device controlling said correcting device to correct the irradiation angle in accordance with the amount of tilt determined by said tilt determining device when the information recording apparatus or the information recording/reproducing apparatus records information, and said controlling device controlling said correcting device in accordance with the amount of tilt, in consideration of the offset, and (ii) an optical writing/reading device comprising an irradiating device for irradiating the laser light and which selectively writes the record information onto or reads the record information from the information recording medium by using the laser light, said tilt determining device determining the amount of tilt on the basis of a detected RF signal in place of the detected wobble signal if the RF signal is detected from the photo-detection signal of light from the track read by said optical writing/reading device.

11. A tilt correcting apparatus for correcting tilt in a system configured to record information onto an information recording medium, the tilt correcting apparatus comprising:

a correcting device for changing an irradiation angle of a laser light with respect to the information recording medium;

a controller for controlling the correcting device to set the irradiation angle of the laser light at different angles;

a first detector for detecting a characteristic of a wobble signal at each of multiple different irradiation angles prior to information recording;

a second detector for detecting a characteristic of a radio frequency (RF) signal at each of multiple different irradiation angles prior to information recording; and a tilt determining device for determining an amount of tilt of an information recording surface of the information recording medium based on a difference between a tilt angle at which the wobble signal amplitude is maximized and a tilt angle at which the RF signal is maximized, the controller controlling the correcting device to correct the irradiation angle in accordance with the amount of tilt determined by the tilt determining device when the system records information.

12. An information recording system comprising the tilt correcting apparatus according to claim 11.

13. An information recording/reproducing system comprising the tilt correcting apparatus according to claim 11.

* * * * *